United States Patent
Ando et al.

(10) Patent No.: US 8,405,263 B2
(45) Date of Patent: Mar. 26, 2013

(54) BICYCLE GENERATOR HUB

(75) Inventors: Yoshiaki Ando, Osaka (JP); Takeshi Takachi, Osaka (JP); Lim Puat Thiam, Singapore (SG)

(73) Assignee: Shimano Inc., Osaka (JP)

( * ) Notice: Subject to any disclaimer, the term of this patent is extended or adjusted under 35 U.S.C. 154(b) by 26 days.

(21) Appl. No.: 12/605,447

(22) Filed: Oct. 26, 2009

(65) Prior Publication Data

US 2010/0301711 A1 Dec. 2, 2010

(30) Foreign Application Priority Data

Jun. 1, 2009 (JP) ................................ 2009-132306

(51) Int. Cl.
*H02K 7/18* (2006.01)
*B62J 6/12* (2006.01)

(52) U.S. Cl. .................. 310/67 A; 310/75 C; 310/68 R; 362/473

(58) Field of Classification Search ................ 310/67 A, 310/75 C, 68 R
See application file for complete search history.

(56) References Cited

U.S. PATENT DOCUMENTS

| | | | | | |
|---|---|---|---|---|---|
| 4,677,328 | A | * | 6/1987 | Kumakura | 310/67 R |
| 5,115,159 | A | * | 5/1992 | Takamiya et al. | 310/67 A |
| 5,584,561 | A | * | 12/1996 | Lahos | 362/473 |
| 5,590,946 | A | * | 1/1997 | Jung | 362/475 |
| 5,667,290 | A | * | 9/1997 | Cioletti et al. | 362/473 |
| 5,874,792 | A | * | 2/1999 | Chen et al. | 310/75 C |
| 6,565,242 | B2 | * | 5/2003 | Dai | 362/500 |
| 6,822,357 | B2 | * | 11/2004 | Hung | 310/75 C |
| 6,924,569 | B2 | * | 8/2005 | Endo et al. | 310/67 A |
| 6,974,144 | B2 | * | 12/2005 | Horiuchi | 280/276 |
| 7,023,122 | B2 | * | 4/2006 | Gang | 310/181 |
| 7,042,123 | B2 | | 5/2006 | Kitamura et al. | |
| 7,148,582 | B2 | * | 12/2006 | Matsueda et al. | 290/1 C |
| 7,275,844 | B2 | * | 10/2007 | Watanabe | 362/473 |
| 2004/0189112 | A1 | * | 9/2004 | Fujii et al. | 310/67 A |
| 2005/0037633 | A1 | | 2/2005 | Endo | |
| 2005/0243545 | A1 | * | 11/2005 | Watanabe | 362/192 |
| 2005/0280322 | A1 | * | 12/2005 | Tsou | 310/67 R |
| 2005/0285461 | A1 | * | 12/2005 | Kitamura et al. | 310/67 A |
| 2006/0001323 | A1 | * | 1/2006 | Gang | 310/67 A |
| 2007/0188037 | A1 | * | 8/2007 | Lau | 310/152 |
| 2007/0296313 | A1 | * | 12/2007 | Wang | 310/67 A |
| 2009/0174295 | A1 | * | 7/2009 | Lin | 310/67 A |

FOREIGN PATENT DOCUMENTS

| | | | |
|---|---|---|---|
| CN | 1715125 A | | 1/2006 |
| JP | 52009808 A | * | 1/1977 |
| JP | 55002385 A | * | 1/1980 |
| JP | 04078677 A | * | 3/1992 |
| JP | 05319334 A | * | 12/1993 |
| JP | 11263259 A | * | 9/1999 |
| JP | 2003009449 A | * | 1/2003 |
| JP | 2003-229418 A | | 8/2004 |
| JP | 2005343231 A | * | 12/2005 |
| JP | 2006273300 A | * | 10/2006 |

* cited by examiner

*Primary Examiner* — Tran N. Nguyen
*Assistant Examiner* — Alex W Mok
(74) *Attorney, Agent, or Firm* — Global IP Counselors, LLP (57) ABSTRACT

A generator hub is basically provided with a hub shaft, a generator mechanism, a connector and a positioning device. The generator mechanism is provided on the hub shaft. The connector is disposed on the hub shaft and electrically connected to the generator mechanism. The positioning device is disposed on the hub shaft, the positioning device being configured and arranged to position the connector with respect to a frame of a bicycle in a rotational direction about the hub shaft.

10 Claims, 6 Drawing Sheets

BICYCLE GENERATOR HUB

CROSS-REFERENCE TO RELATED APPLICATIONS

This application claims priority under 35 U.S.C. §119 to Japanese Patent Application No. 2009-132306, filed Jun. 1, 2009. The entire disclosure of Japanese Patent Application No. 2009-132306 is hereby incorporated herein by reference.

BACKGROUND OF THE INVENTION

1. Field of the Invention

This invention generally relates to a hub for a wheel. More specifically, the present invention relates to a generator hub that is mounted to a frame of a bicycle.

2. Background Information

Some bicycles are equipped with a generator to power electrical devices on the bicycle. For example, Japanese Laid-Open Patent Publication No. 2004-229418 discloses a conventional generator hub that serves as a hub positioned at a center of a wheel of a bicycle and has an electric generator mechanism. The generator hub has a hub shaft, a generator mechanism provided on the hub shaft, and a connector (electrical connector) that is provided on the hub shaft and connected to the generator mechanism. The connector is provided to supply electric power from the generator mechanism to the electric device, such as a front lamp, etc., that is mounted on the bicycle. The connector is installed on the hub shaft alongside the generator mechanism. The connector is provided with a wire connecting section for connecting an electric wire serving to connect the electric device to the generator mechanism. The connector is fastened to the hub shaft with a locknut. The hub shaft is fastened to an end portion of the frame with a nut member installed in an axially outward position relative to the locknut.

SUMMARY OF THE INVENTION

It has been discovered that conventional generator hubs are typically mounted to a bicycle frame by holding the generator hub with one hand to position the generator hub such that a wire can be more easily run to the wire connecting section of the connector. It is troublesome to position the generator hub in this manner every time the generator hub is mounted to a bicycle frame. In short, the task of running (arranging) a wire is troublesome with a generator hub according to the prior art.

One object of the present invention is to provide a generator hub that enables the task of running a wire to be accomplished more efficiently when the generator hub is mounted to a frame.

A generator hub according to a first aspect mainly includes a hub shaft, a generator mechanism, a connector and a positioning device. The generator mechanism is provided on the hub shaft. The connector is disposed on the hub shaft and electrically connected to the generator mechanism. The positioning device is disposed on the hub shaft, the positioning device being configured and arranged to position the connector with respect to a frame of a bicycle in a rotational direction about the hub shaft.

When this generator hub is mounted to the frame of the bicycle, the positioning device provided on the hub shaft positions the connector about the hub shaft in a rotational direction while the hub shaft is mounted to the frame. Thus, when the hub shaft is mounted to a frame of a bicycle, the connector can be positioned in a rotational direction of the hub shaft and thereby positioned with respect to the frame. Consequently, it is not necessary to position the generator hub every time the generator hub is mounted. As a result, the task of running a wire can be accomplished more efficiently.

A generator hub according to a second aspect is the generator hub according to the first aspect, wherein the positioning device includes a protrusion extending from the hub shaft to engage with a fork end of the frame. With this aspect, the connector can be positioned easily by engaging the protruding part with the end portion of the frame.

A generator hub according to a third aspect is the generator hub according to the second aspect, wherein the connector and the protrusion are fixed together as an integral unit that is detachably provided on the hub shaft. With this aspect, it is not necessary to position the connector and the protruding part with respect to each other during assembly because the connector and the protruding part are provided as a one-piece integral unit and are detachably provided on the hub shaft.

A generator hub according to a fourth aspect is the generator hub according to any one of the first to third aspects, wherein the hub shaft is further provided with a quick-release mechanism for easy attachment and detachment of the hub shaft to and from the frame. When the generator hub is equipped with a quick-release mechanism, the generator hub can be attached to and detached from the bicycle frame more easily. Thus, the effect of the positioning device is more apparent in a generator hub equipped with a quick-release mechanism.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
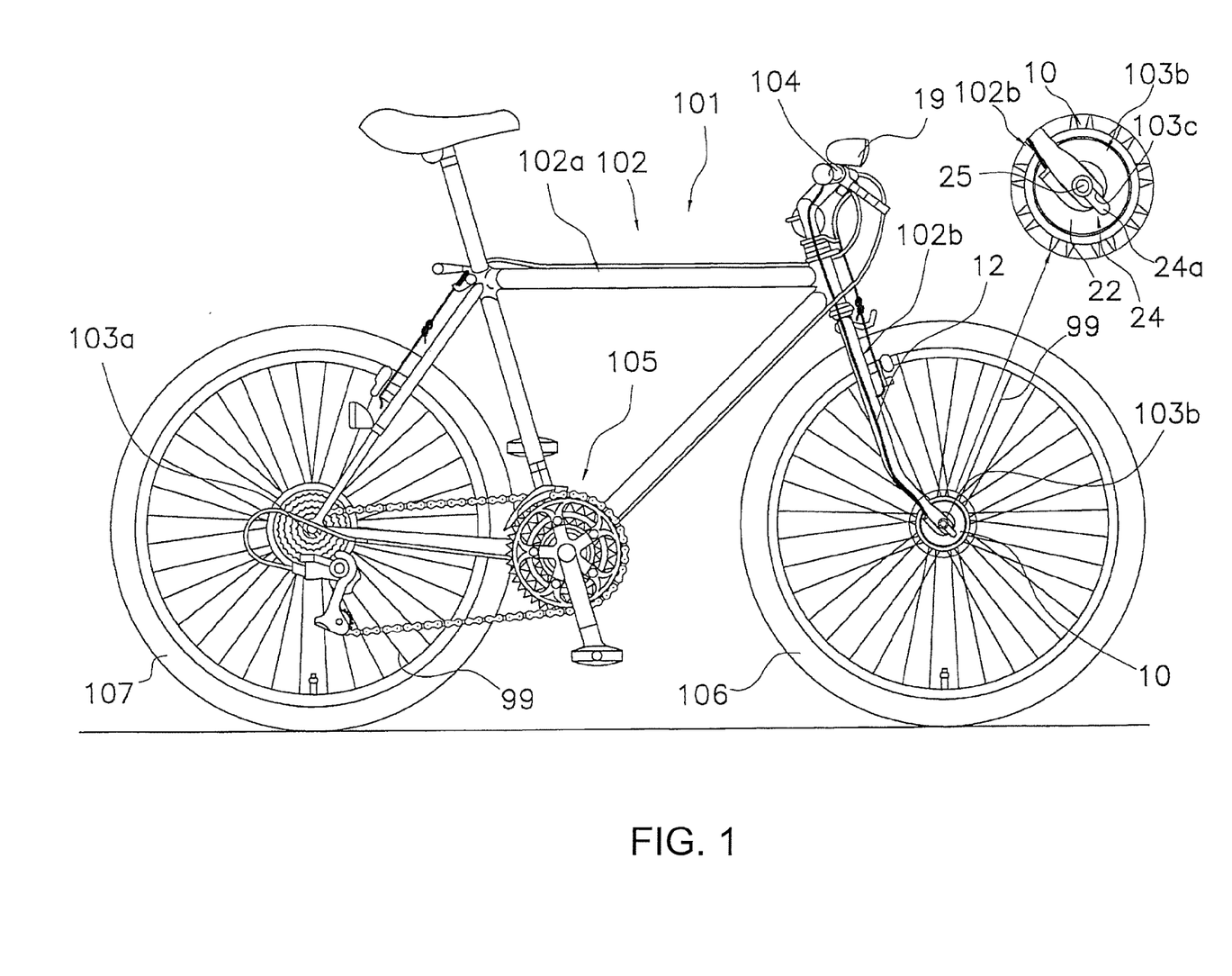
FIG. 1 is a side elevational view of a bicycle which is equipped with a generator hub according to a first embodiment.

Referring initially to FIG. 1, a bicycle 101 is illustrated with a generator hub 10 in accordance with a first embodiment. The bicycle 101 mainly includes a frame 102, a handlebar unit 104, a drive section 105, a front wheel 106 and a rear wheel 107. The drive section 105 includes a chain, pedals, etc. The front wheel 106 has a plurality of spokes 99. The rear wheel 107 also has a plurality of spokes 99. The frame 102 has a frame body 102a and a front fork 102b. The front fork 102b is mounted to a front portion of the frame body 102a such that it can pivot freely about a diagonal axis. The handlebar unit 104 is fastened to an upper end of the front fork 102b. The front fork 102b has a pair of front ends 103b for mounting the front wheel 106, as shown in the enlarged portion of FIG. 1. The frame body 102a has a pair of rear ends 103a provided on a rear end portion of the frame body 102a for mounting the rear wheel 107. Each of the rear ends 103a and the front ends 103b has a mounting groove 103c (only shown with respect to the front ends 103b in FIG. 2). The mounting groove 103c has a groove width of 8.5 mm to 10 mm, for example.

In this illustrated embodiment, the generator hub 10 is built into the front wheel 106 of the bicycle 101. Electric power generated by the generator hub 10 is supplied to a front lamp 19 through electrical wiring 12. The front lamp 19 is equipped with a light sensor. The electrical wiring 12 includes an electric power supply wire 12a and a ground wire 12b.

Figure 2:
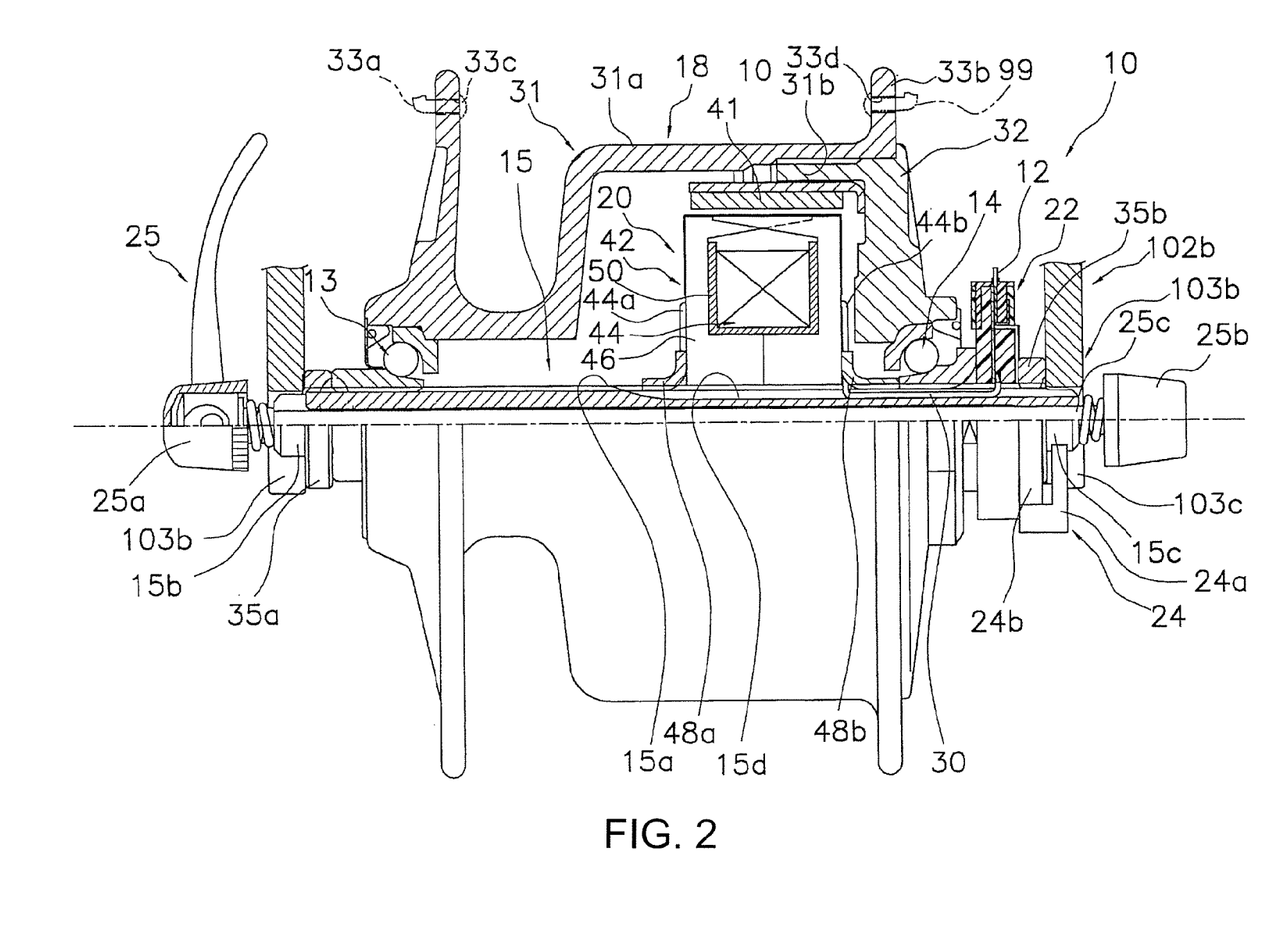
FIG. 2 is a half cross sectional view of the generator hub according to the embodiment.
Figure 3:
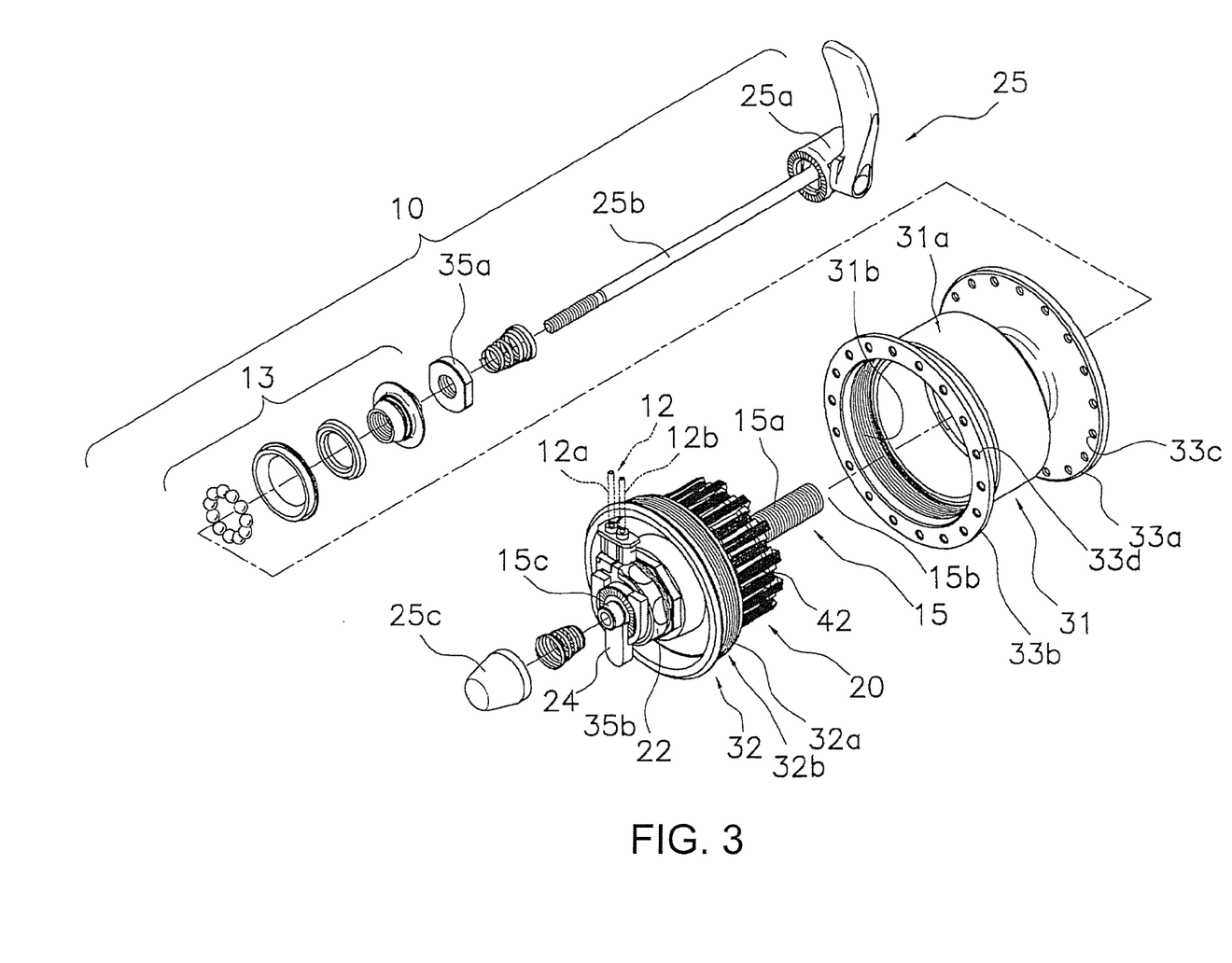
FIG. 3 is an exploded perspective view of the generator hub.

As shown in FIG. 2, the generator hub 10 is mounted to the front ends 103b of the front fork 102b. As shown in FIGS. 2 and 3, the generator hub 10 includes a hub shaft 15, a hub shell 18, a generator mechanism 20, a connector 22 (electrical connector), and a positioning device 24. The hub shaft 15 is fastened to the front ends 103b of the front fork 102b of the bicycle frame 101. As shown in FIGS. 2 and 3, the hub shell 18 is arranged around the outside of the hub shaft 15. The generator mechanism 20 is arranged between the hub shaft 15 and the hub shell 18. The connector 22 is provided on the hub shaft 15 and connected to the generator mechanism 20. The connector 22 supplies electric power generated by the generator mechanism 20 to an external electric device, such as the front lamp 19, etc.

The generator hub 10 is also provided with a quick-release mechanism 25 for easy attachment and detachment of the hub shaft 15 to and from the front fork 102b of the frame 102. The quick-release mechanism 25 serves to fasten the hub shaft 15 to the front ends 103b. The quick-release mechanism 25 mainly includes an operating section 25a, a nut 25b and a skewer rod 25c (see FIG. 3). The operating section 25a has a cam lever pivotally attached to one end of the skewer rod 25c. The skewer rod 25c extends linearly from the operating section 25a through the hub shaft 15. The nut 25b is attached to the opposite end of the skewer rod 25c from the operating section 25a. The skewer rod 25c is arranged to move back and forth in an axial direction relative to the operating section 25a in response to opening and closing of the cam lever of the operating section 25a.

The hub shaft 15 is a hollow cylindrical shaft that is configured for the skewer rod 25c to pass through the inside thereof. The hub shell 18 is rotatably supported on a first end of the hub shaft 15 by a first bearing 13 and rotatably supported on a second end of the hub shaft 15 by a second bearing 14. An externally threaded portion 15a is formed on an outer circumferential surface of the hub shaft 15 to enable the first bearing 13, the second bearing 14, and the generator mechanism 20 to be fastened to the hub shaft 15. The first bearing 13 is screwed onto a first end (left end in FIG. 2) of the hub shaft 15 and the second bearing 14 is screwed onto a second end (right end in FIG. 2). A first locknut 35a is attached to the first end of the hub shaft 15 by being screwed onto the externally threaded portion 15a. A second locknut 35b is attached to the second end of the hub shaft 15 by being screwed onto the externally threaded portion 15a. The first bearing 13, the second bearing 14, the hub shell 18, and the connector 22 are positioned along and locked onto the hub shaft by being sandwiched between the first locknut 35a and the second locknut 35b.

The hub shaft 15 has a first fork engaging portion 15b and a second fork engaging portion 15c. Each of the fork engaging portions 15b and a 15c has a smaller diameter that is configured to mate with the front fork 102b. A wire passage groove 15d is formed in the outside circumferential surface of the hub shaft 15 and spans from a portion where the generator mechanism 20 is mounted to the first end portion of the externally threaded portion 15a for passing an internal wire 30 connected between the generator mechanism 20 and the connector 22. The hub shaft 15 is non-rotatably fixed to the front fork 102b by the quick-release mechanism 25.

The hub shell 18 has a shell body 31 and a mounting member 32. The mounting member 32 screws into the shell body 31. The shell body 31 has a first hub flange 33a and a second hub flange 33b. The shell body 31 is a cylindrical member configured to extend along an axial direction of the hub shaft 15. The shell body 31 has a bulged portion 31a at second end (right-hand end in FIG. 2) thereof that is bulged in a radially outward direction in comparison to a first end. The bulged portion 31a is provided to house the generator mechanism 20. An internally threaded portion 31b is formed in an internal circumferential surface of the second end of the bulged portion 31a for meshing with the mounting member 32. A first hub flange 33a and a second hub flange 33b are formed on the external circumference of the shell body 31 at axially opposite ends of the shell body 31. The first hub flange 33a is provided with a plurality of first mounting holes 33c. The first mounting holes 33c are arranged with equal spacing along a circumferential direction for mounting radially inward end portions of the spokes 99. The second hub flange 33b is provided with a plurality of second mounting holes 33d. The second mounting holes 33d are arranged with equal spacing along a circumferential direction for mounting radially inward end portions of the spokes 99.

The mounting member 32 is a generally circular disk-shaped member. The second bearing 14 is mounted on an inside of the mounting member 32. The mounting member 32 has a cylindrical portion 32b on the outside of which is formed an externally threaded portion 32a configured to mesh with the internally threaded portion 31b of the shell body 31.

The hub shell 18 is rotatably supported on the hub shaft 15 by the first bearing 13 and the second bearing 14, which are mounted on the hub shaft 15.

The generator mechanism 20 is a claw pole type generator mechanism having a permanent magnet 41 and an internal stationary unit 42. The permanent magnet 41 is fixed to an internal circumferential surface of the hub shell 18. The internal stationary unit 42 is fixed to the hub shaft 15, and is arranged facing opposite a radially inward facing portion of the permanent magnet 41. The permanent magnet 41 includes a plurality of (e.g., four) magnetic bodies arranged on an internal circumferential surface of the cylindrical portion 32b of the mounting member 32 with equal spacing in a circumferential direction. The permanent magnet 41 is magnetized so as to have north (N) and south (S) poles arranged alternately with equal spacing such that each faces an outer circumferential portion of a laminated yoke 46 (discussed later).

The internal stationary unit 42 has a ring-shaped coil 44 and a claw pole type laminated yoke 46. The claw pole type laminated yoke 46 is arranged to surround a perimeter of the coil 44. The coil 44 and the laminated yoke 46 are non-rotatably secured to the hub shaft 15 by a first mounting nut 48a and a second mounting nut 48b that are screwed onto the externally threaded portion 15a so as to sandwich the coil 44 and laminated yoke 46. The coil 44 and the laminated yoke 46 are positioned in the axial direction such that they are housed inside the bulged portion 31a. The coil 44 is wound onto a bobbin 50. A first end 44a of the coil is electrically connected to the hub shaft 15 through, for example, the first mounting nut 48a. A second end 44b of the coil 44 is electrically connected to the internal wire 30.

Figure 4:
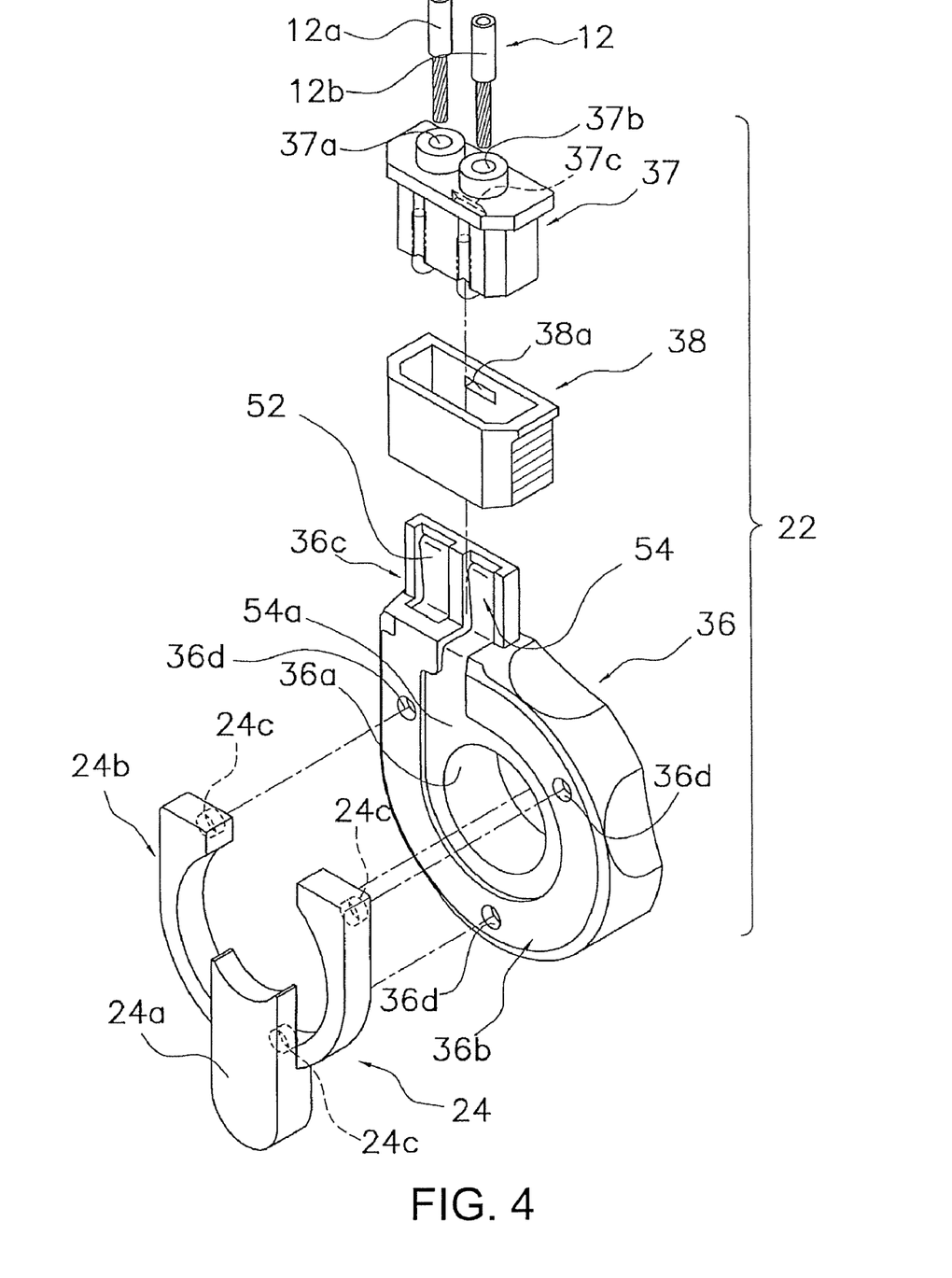
FIG. 4 is an exploded perspective view of a connector of the generator hub.

As shown in FIGS. 3 and 4, the connector 22 is fixed to the hub shaft 15 as explained previously. The connector 22 includes a connector body 36 that has generally the shape of a thick circular disk and is made of a synthetic resin, a connector cap 37 contrived to latch onto the connector body 36 in an elastic manner, and a connector cover 38 configured for the connector cap 37 to fit therein.

A through hole 36a is formed in a center portion of the connector body 36 for the hub shaft 15 to pass through. The connector body 36 also has a cylindrical portion 36b and a protruding portion 36c. The protruding portion 36c is arranged to protrude in a radially outward direction from the cylindrical portion 36b. One axially facing (main) surface of the cylindrical portion 36b is provided with a plurality of (e.g., three) engaging recesses 36d (e.g., circular recesses). The engaging recesses 36d are configured for engaging the positioning device 24.

A first connecting terminal 52 and a second connecting terminal 54 are provided on one main surface of the protruding portion 36c. The first connecting terminal 52 passes through the inside of the connector body 36, and is electrically connected to the internal wire 30, which is connected to the second end 44b of the coil 44. The first connecting terminal 52 is connected to, for example, the electric power supply wire 12a of the front lamp 19. The second connecting terminal 54 has a connecting portion 54a that is provided around a perimeter of the through hole 36a. The connecting portion 54a is configured to be electrically connected to the hub shaft 15 through the second locknut 35b. The first connecting terminal 54 is connected to, for example, the ground wire 12b of the front lamp 19.

The connector cap 37 is a synthetic resin member configured to be mounted onto the protruding portion 36c. The connector cap 37 is generally cylindrical with a generally rectangular passage that opens at a bottom end thereof. The connector cap 37 has an elastic latching piece 37c that is configured to engage with a latching hole 38a of the connector cover 38.

The connector cap 37 is serves to seal the connector 22 and to bend tip end portions of the power supply wire 12a and the ground wire 12b of the electrical wiring 12 such that they contact the first connecting terminal 52 and the second connecting terminal 54, respectively. A first wire insertion hole 37a and a second wire insertion hole 37b are formed on an upper surface of the connector cap 37 for inserting the power supply wire 12a and the ground wire 12b.

The connector cover 38 is attached to the connector cap 37 after the power supply wire 12a has been inserted into the first wire insertion hole 37a and the ground wire 12b has been inserted into the second wire insertion hole 37b and each of the wires 12a and 12b has been bent into a U-shape running from an inside to an outside of the connector cap 37. When the connector cover 38 is attached to the connector cap 37, the elastic latching piece 37c engages with the latching hole 38a so that the power supply wire 12a and the ground wire 12b are secured in their positions inside. As a result, the power supply wire 12a can be arranged to contact the first connecting terminal 52 and the ground wire 12b can be arranged to contact the second connecting terminal 54 in a stable fashion.

The positioning device 24 is detachably provided on the connector 22 and held in place by the locknut 35b. The positioning device 24 includes a positioning protrusion 24a and a mounting portion 24b. The positioning protrusion 24a is configured to engage with a front end 103b. The mounting portion 24b is formed as a one-piece integral unit with the positioning protrusion 24a. The positioning protrusion 24a protrudes from the mounting portion 24b in both an axially outward direction of the hub shaft 15 and a radially outward direction of the hub shaft 15. The positioning protrusion 24a is configured to engage with a front end 103b of the front fork 102b and position the connector 22 about the hub shaft 15. A width dimension of the positioning protrusion 24a is slightly narrower than a groove width dimension of the front end 103b such that it engages with the mounting grove 103c of the front end 103b (see FIG. 1).

The mounting portion 24b is non-rotatably attached to the axially facing (main) surface of the connector 22 in a position radially to the outside of the second locknut 35b. A radially inward portion of the mounting portion 24b has a C-shaped to enable the mounting portion 24b to be mounted on an outside portion of the second locknut 35b. The mounting portion 24b has a plurality of (e.g., three) engaging protrusions 24c formed on a surface that faces the connector 22. The engaging protrusions 24c are configured and arranged to engage with the engaging recesses 36d formed on the one main surface of the connector body 36. The engaging protrusions 24c of the mounting portion 24b fit into the mounting recesses 36d of the connector 22 such that the positioning device 24 and the connector 22 become an integral unit. Thus, the connector 22 and the positioning protrusion 24a are an integral unit. The positioning protrusion 24a preferably extends in one radial direction from the hub shaft 15 (opposite direction as the protruding portion 36c in this embodiment) when the hub shaft 15 is viewed from an end face thereof. It is acceptable to use a screw or the like to securely fasten the positioning device 24 to the connector 22.

When this generator hub 10 is mounted to the front fork 102b of the frame 102 along with the front wheel 106, the hub shaft 15 is mounted in the front ends 103b such that the positioning protrusion 24a engages with a mounting groove 103c of a front end 103b. The nut 25 of the quick-release groove 25 is then tightened and, finally, the cam lever of the operating section 25a is closed such that the front wheel 106 is securely fastened to the front ends 103b.

With this generator hub 10 thus configured, the connector 22 can be positioned with respect to the front fork 102b in a rotational direction about the hub shaft 15 when the generator hub 10 is mounted to the front ends 103b of the frame 102. Consequently, it is not necessary to position the generator hub 10 every time the generator hub 10 is mounted. As a result, the task of running a wire can be accomplished more efficiently.

Additionally, the positioning protrusion 24a is arranged to behave integrally with the connector 22 and is detachably arranged on the hub shaft 15. As a result, the structure of the positioning protrusion 24a is simple and the connector 22 can be positioned easily.

The generator hub 10 is preferably equipped with the quick-release mechanism 25 so that the generator hub 10 can be easily attached to and detached from the frame 102 of the bicycle 101. Thus, the effect of the positioning device 24 is more apparent with the generator hub 10 having the quick-release mechanism 25.

In the previous embodiment, the positioning protrusion 24a of the positioning device 24 is arranged as an integral unit with the connector 22. It is also acceptable to use a configuration in which a connector 122 (electrical connector) and a positioning device 124 or 224 are provided separately (not interlocked) on a hub shaft 15 or 215, as shown in FIGS. 5 and 6.

Figure 5:
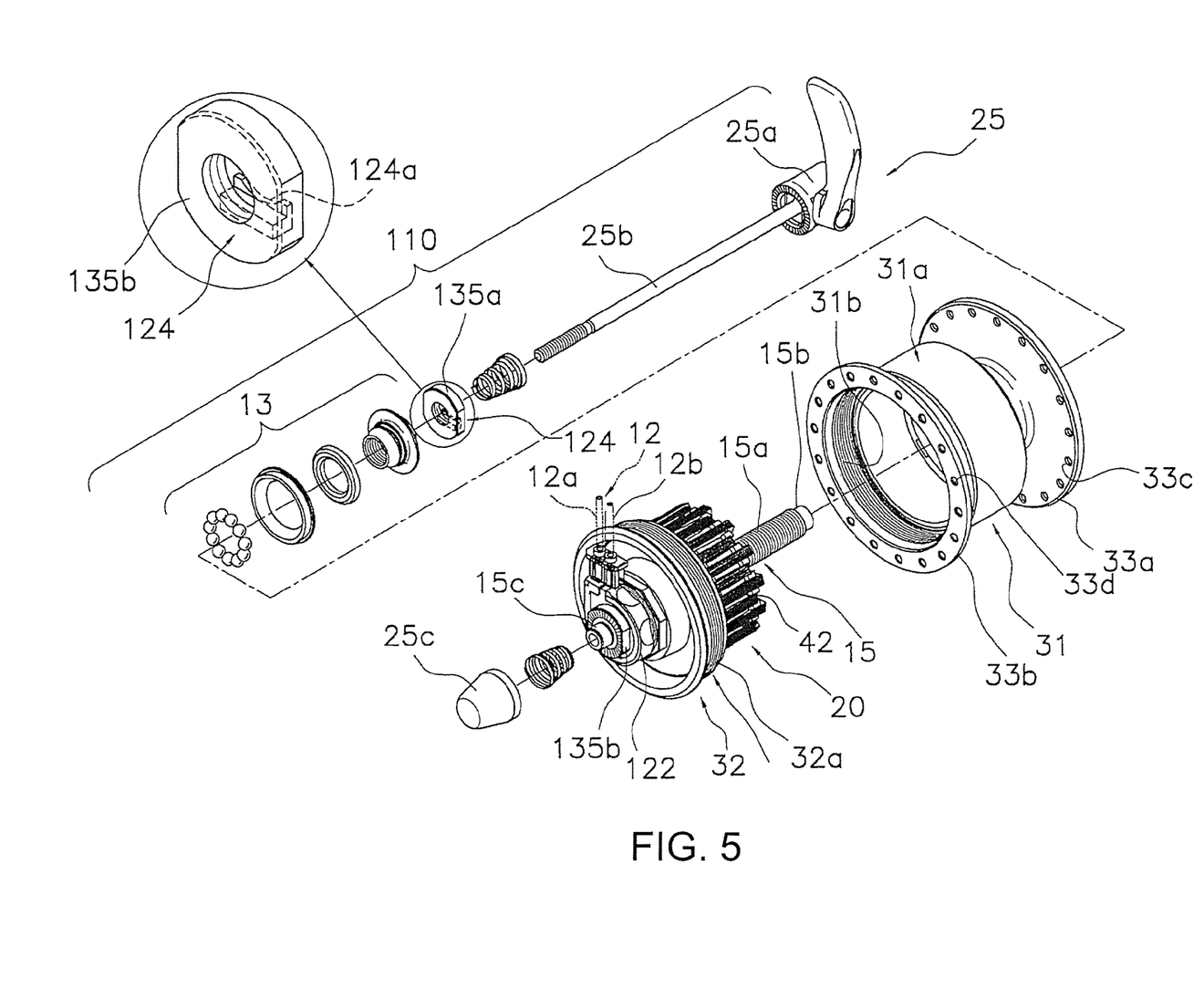
FIG. 5 is a half cross sectional view, corresponding to FIG. 2, of a generator hub according to another embodiment.

The positioning device 124 of the generator hub 110 shown in FIG. 5 has a positioning protrusion 124a that is provided on a locknut 135b. The positioning protrusion 124a is configured to extend outward in an axial direction of the hub shaft 15 (rightward in FIG. 5). The positioning protrusion 124a has such a width that it can engage with the mounting groove 103c of the front end 103b. The positioning protrusion 124a is formed as a one-piece integral unit with the locknut 135b.

Figure 6:
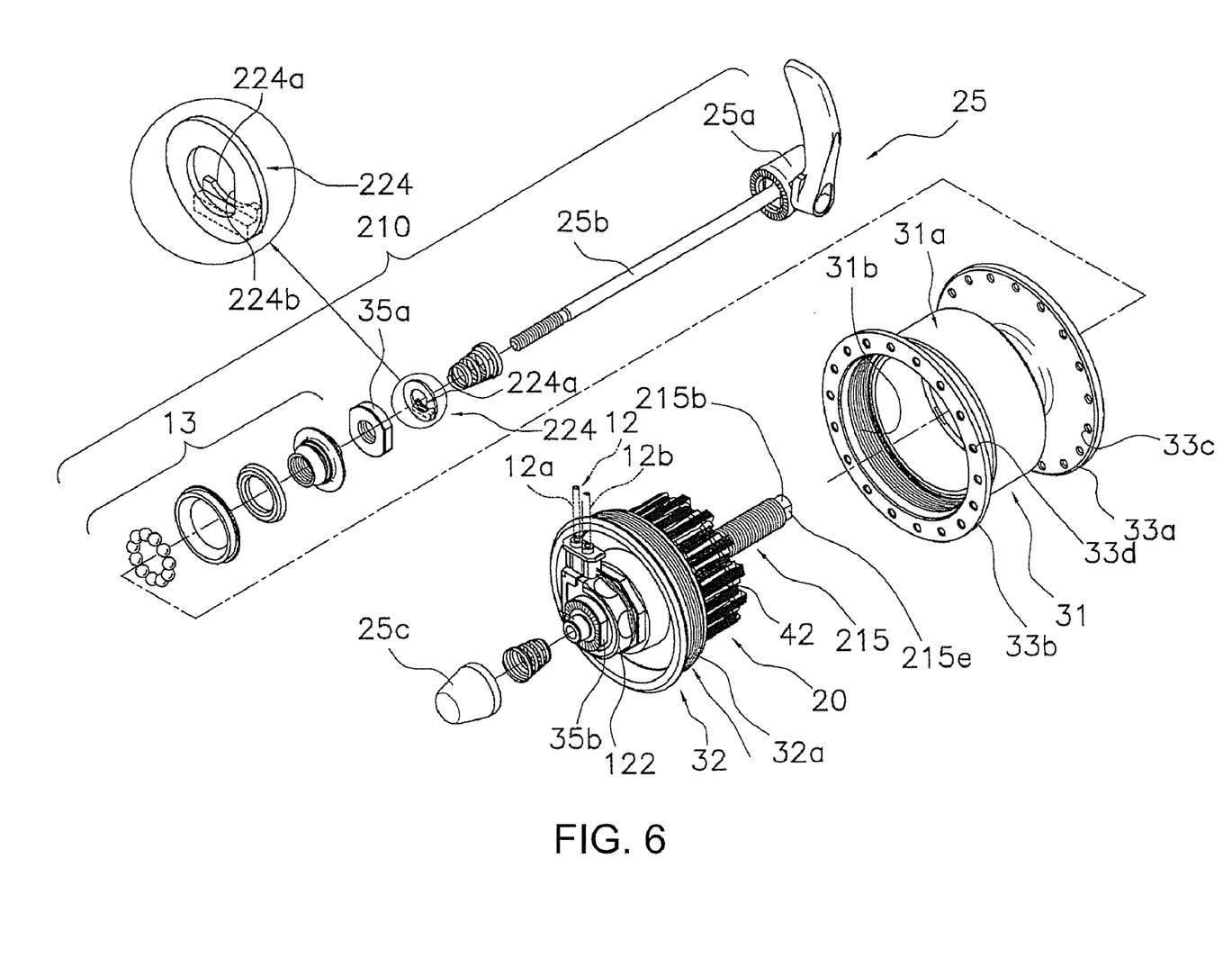
FIG. 6 is a half cross sectional view, corresponding to FIG. 2, of a generator hub according to still another embodiment.

The first fork engaging portion 215b of the hub shaft 215 shown in FIG. 6 has an engaging portion 215e obtained by linearly removing an arc-shaped portion of the hub shaft 215. Thus, the engaging portion 215e has a D-shaped cross section.

The positioning device 224 of the generator hub 210 is a washer-like member mounted non-rotatably on the first end of the hub shaft 215. The positioning device 224 has a positioning protrusion 224a configured and arranged to extend in a radial direction of the hub shaft 215 and an engaging hole 224b arranged in a center portion thereof and configured to engage non-rotatably with the engaging portion 215e of the hub shaft 215. The positioning protrusion 224a has such a width that it can engage with the mounting groove 103c of the front end 103b.

Even though the positioning devices 124 and 224 according to these other embodiments are not interlocked with the connector 122, the connector 122 can be positioned with respect to the front fork 102b in a rotational direction about the hub shaft. Consequently, it is not necessary to position the generator hub 10 every time the generator hub 10 is mounted. As a result, the task of running a wire can be accomplished more efficiently.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The shape of the positioning protrusion is not limited to the shapes presented in the previous embodiments. The shape can be set as required depending on the shape of the fork ends of the frame. For example, it is acceptable to shape the positioning protrusion such that it follows and outer contour of a fork end.

Although the illustrated embodiments illustrate generator hubs that are used on the front wheel, the generator hub can also be applied to a rear wheel. In such a case, the positioning device would engage the rear end of the frame body.

Although the illustrated embodiments illustrate generator hubs in which the connector is configured to enable two wires, i.e., a power supply wire and a ground wire, to be connected, the generator hub can have a connector that is configured to enable one wire to be connected with the ground being established through the hub shaft and the frame.

Thus, the foregoing descriptions of the embodiments according to the present invention are provided for illustration only, and not for the purpose of limiting the invention as defined by the appended claims and their equivalents.

What is claimed is:

1. A generator hub comprising:
    a hub shaft;
    a generator mechanism provided on the hub shaft;
    a connector disposed on the hub shaft and electrically connected to the generator mechanism; and
    a positioning device disposed on the hub shaft, the positioning device being configured and arranged to position the connector with respect to a frame of a bicycle relative to a rotational direction about the hub shaft, the positioning device including a protrusion that extends in an axial direction relative to the hub shaft the protrusion extending into a groove of a fork end of the frame, the positioning device being at least partially located between the connector and the frame of the bicycle in the axial direction relative to the hub shaft.

2. The generator hub according to claim 1, wherein the groove is a wheel mounting groove of the fork end of the frame.

3. The generator hub according to claim 2, wherein
    the connector and the protrusion are fixed together as an integral unit that is detachably provided on the hub shaft.

4. The generator hub according to claim 3, wherein
    the hub shaft is further provided with a quick-release mechanism for easy attachment and detachment of the hub shaft to and from the frame.

5. The generator hub according to claim 2, wherein
    the hub shaft is further provided with a quick-release mechanism for easy attachment and detachment of the hub shaft to and from the frame.

6. The generator hub according to claim 5, wherein
    the positioning device includes a locknut of the quick-release mechanism with the protrusion provided on the locknut which is threaded on the hub shaft.

7. The generator hub according to claim 5, wherein
    the positioning device includes a washer of the quick-release mechanism with the protrusion provided on the washer which is non-rotatably mounted on the hub shaft.

8. The generator hub according to claim 1, wherein
    the hub shaft is further provided with a quick-release mechanism for easy attachment and detachment of the hub shaft to and from the frame.

9. The generator hub according to claim 1, wherein
    the protrusion also extends in a radially outward direction away from the hub shaft.

10. The generator hub according to claim 1, wherein
    the connector is spaced apart from the frame of the bicycle and is located between the generator mechanism and the frame of the bicycle relative to the axial direction relative to the hub shaft.

* * * * *